United States Patent [19]
Moriarty

[11] Patent Number: 5,302,053
[45] Date of Patent: * Apr. 12, 1994

[54] APPARATUS FOR REPLACING BURIED PIPE

[76] Inventor: Martin Moriarty, Valentia Island, County Kerry, Ireland

[*] Notice: The portion of the term of this patent subsequent to Dec. 22, 2009 has been disclaimed.

[21] Appl. No.: 983,641

[22] Filed: Dec. 1, 1992

Related U.S. Application Data

[63] Continuation of Ser. No. 817,905, Jan. 8, 1992, Pat. No. 5,173,009.

[51] Int. Cl.$^5$ .......................... F16L 55/00; F16L 1/00
[52] U.S. Cl. .................... 405/154; 166/55.2; 405/184
[58] Field of Search .................. 405/154, 184, 156; 166/55.2, 55.3, 55; 30/92.5, 92; 138/97; 254/29 R; 15/104.07

[56] References Cited

U.S. PATENT DOCUMENTS

| | | | |
|---|---|---|---|
| 3,181,302 | 5/1965 | Lindsay . | |
| 4,505,302 | 3/1985 | Streatfield et al. | 138/97 |
| 4,634,313 | 1/1987 | Robbins | 405/154 X |
| 4,657,436 | 4/1987 | Yarnell | 405/154 |
| 4,674,914 | 6/1987 | Wayman et al. | 405/154 |
| 4,693,404 | 9/1987 | Wayman et al. | 405/156 |
| 4,720,211 | 1/1988 | Streatfield et al. | 405/154 |
| 4,732,222 | 3/1988 | Schmidt | 175/22 |
| 4,738,565 | 4/1988 | Streatfield et al. | 405/154 |
| 4,848,964 | 7/1989 | Yarnell | 405/156 |
| 4,886,396 | 12/1989 | Akesaka | 405/184 |
| 4,915,543 | 4/1990 | Akesaka | 405/156 |
| 4,925,344 | 5/1990 | Peres et al. | 405/154 |
| 4,981,181 | 1/1991 | Hesse | 405/154 |
| 5,013,188 | 5/1991 | Campbell et al. | 405/184 |
| 5,076,731 | 12/1991 | Luksch | 405/154 |

*Primary Examiner*—Dennis L. Taylor
*Attorney, Agent, or Firm*—Heller, Ehrman, White & McAuliffe

[57] ABSTRACT

Apparatus for replacing buried pipe includes a body including a first cylindrical portion having a diameter small enough to fit within an existing pipe, a second cylindrical portion having a larger diameter than the first cylindrical portion and sufficient to enclose a replacement pipe, and a frustro-conical portion joining the first and second cylindrical portions. The bursting head includes protrusions extending along the first cylindrical section, the frustro-conical section, and at least partially along the second cylindrical section. The protrusions are tapered such that at the narrowest point they may fit within an existing pipe and at the widest point will extend outward beyond the second cylindrical portion of the body. A replacement pipe is attached to the head and the head is drawn through an existing pipe. The protrusions break up the existing pipe and break up the surrounding earth to facilitate the passage of the head.

17 Claims, 3 Drawing Sheets

APPARATUS FOR REPLACING BURIED PIPE

This is a continuation of application Ser. No. 07/817,905 filed Jan. 8, 1992, now U.S. Pat. No. 5,173,990.

BACKGROUND OF THE INVENTION

The present invention relates in general to apparatus for replacing buried pipe. It relates in particular to an apparatus which may be drawn through an existing buried pipe to fracture and expand the pipe while simultaneously drawing a replacement pipe into the space previously occupied by the existing pipe.

Distribution systems for utilities, such as water and gas, include a network of pipelines which may be buried under paved highways, streets, or sidewalks. It is often necessary to replace one or more pipes in a distribution network, either to replace a damaged section of pipe, or to replace an existing pipe with a larger pipe having greater throughput capacity.

It is preferable to replace pipes which are buried under paved highways, streets, or sidewalks, with minimum disturbance of the surface under which they are buried. Existing pipe networks are often constructed from pipes made of a fracturable material such as a ceramic or cast iron.

For a network such as a gas distribution network modern plastic pipes may now be used. Plastic pipes are flexible and resist breakage due to earth movement which may be created by a subsidence or an earthquake.

Methods have been developed whereby an existing pipe of a fracturable material may be replaced by moving an apparatus through the pipe to fracture it into fragments, and to force the fragments outward to create a space for a replacement pipe which may have a larger diameter than the existing pipe. A length of pipe to be replaced may be accessed by a hole excavated at each end of the length of pipe. A fracturing apparatus may be introduced, via one of the holes, into an open end of the existing pipe, and moved along the path of the existing pipe while new pipe is fed down the hole down into the space created by the apparatus. The new pipe may be moved through the space by drawing it from the other hole. The pipe may be drawn by applying a pulling force, for example, using a cable attached to a winch. The new pipe may be attached to the pipe fracturing apparatus. When such a method is used, it is not generally necessary to dig a continuous trench to replace a pipe. This may reduce road repair costs and save time spent laying new pipe.

Certain types of pipe fracturing apparatus, and methods for using the same, are disclosed in U.S. Pat. Nos. 4,505,302, 4,720,211, 4,732,222, 4,738,565, 4,886,396, and 5,013,188. The methods disclosed rely primarily on a pushing-force to activate the pipe fracturing apparatus. The pushingforce may be continuous, for example, applied by a hydraulic ram. The pushing-force may also be intermittently or percussively applied, for example, by a pneumatically driven mechanism. A pulling force may be applied to such apparatus only to maintain the direction of advance of the fracturing apparatus through the existing pipe, and to draw the replacement pipe behind the apparatus.

In practice, certain problems may be encountered when operating hydraulic or percussive driven apparatus. Fracturing apparatus which is percussively driven may be directionally unstable. Directionally unstable apparatus may veer from the desired direction of motion down the existing pipeline. This may cause pipe fragments and debris to build up in front of the apparatus to such an extent that it may not be possible to advance it further, or to correct its direction of motion, by applying a pulling force. When this happens, it is usually necessary to dig a hole to locate the fracturing apparatus, and to restart the replacement process from this hole. This may significantly increase the time and cost of pipe replacement.

When drawing a replacement pipe, it is preferable to protect a front portion of the replacement pipe. This may be done by enclosing it with a rigid sleeve included in the fracturing apparatus. In pneumatically driven apparatus, it is difficult to provide a simple means whereby an adequate length of pipe can be quickly and easily drawn into the apparatus to protect it.

Accordingly it is an object of the present invention to provide a pipe replacement apparatus which may be driven by a pulling force only.

It is another object of the present invention to provide a pipe replacement apparatus which is directionally stable.

It is yet another object of the present invention to provide a pipe replacement apparatus which does not cause build up of debris in its direction of travel.

It is a further object of the present invention to provide a pipe replacement apparatus which protects the replacement pipe and may be quickly and easily attached thereto.

Additional objects and advantages of the invention will be set forth in the description which follows, and in part will be obvious from the description or may be learned by practice of the invention. The objects and advantages of the invention may be realized and obtained by means of the instrumentalities and combination particularly pointed out in the claims.

SUMMARY OF THE INVENTION

The present invention is directed to an apparatus for replacing an existing pipe with a replacement pipe. The apparatus includes a body having two cylindrical coaxial cylindrical portions, the second cylindrical portion having a larger diameter than the first. The body has an axis generally defined by the axes of the two cylindrical portions. The two cylindrical portions are joined by a frustro-conical portion tapering from the larger to the smaller diameter. The ends of the body are defined by the ends of the cylindrical portions not joined by the frustro-conical section.

At least three elongated protrusions extend radially outward from the body. Each protrusion has an outermost edge including a sloping portion and a straight portion. The sloping portion is inclined to the body axis and extends along the smaller cylindrical portion and the frustro-conical portion. The straight portion is generally parallel to the body axis and extends at least partially along the second cylindrical portion;

a rod extends axially through the body. The rod may be slidably moved along the body axis. At one end of the rod are means for attaching the replacement pipe, and a bearing plate which limits axial motion of the rod by contacting the body. At the other end of the rod are means for connecting the rod to a pulling force. The pulling force may be supplied by a winch connected to the rod by a cable. The rod is sufficiently long that the pipe attachment means may be located outside of the body to facilitate attachment of the replacement pipe. Pulling on the rod draws the replacement pipe into the body and transmits the pulling force, via the bearing plate, to the body.

The apparatus may be constructed from rugged components permanently welded together. No moving parts or removably attached parts are in forceful contact with the existing pipe or earth surrounding it.

The apparatus requires only a pulling force to accomplish existing pipe fracturing and replacement pipe drawing functions.

The extended protrusions in general, and the portion thereof protruding from the larger cylindrical body portion in particular, impart a high degree of directional stability to the apparatus.

The apparatus will withstand a pulling force as high as ten thousand pounds (10,000 lbs).

DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

DETAILED DESCRIPTION OF THE INVENTION

Figure 1:
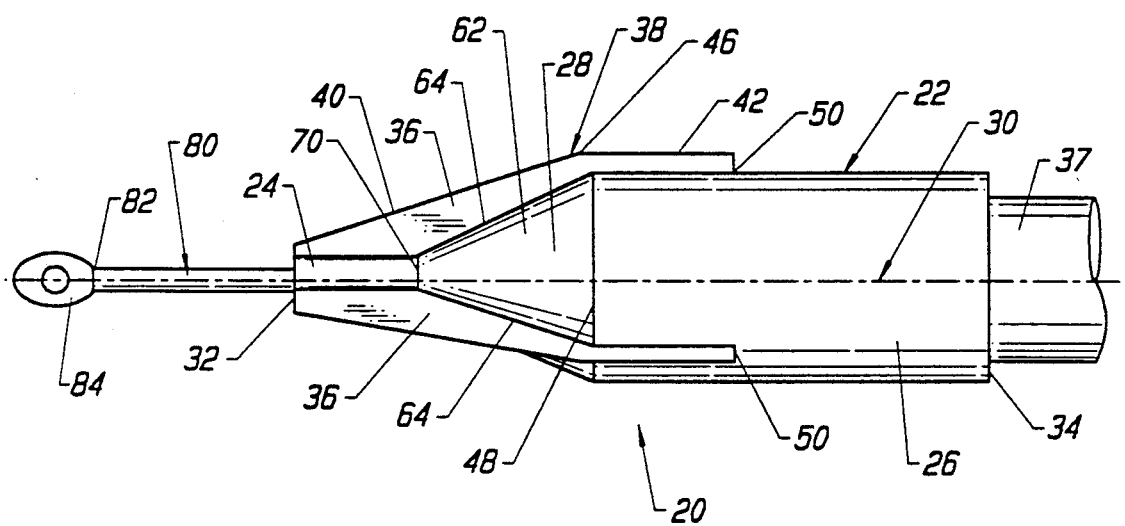
FIG. 1 schematically illustrates a side elevation view of apparatus according to the present invention.
Figure 2:
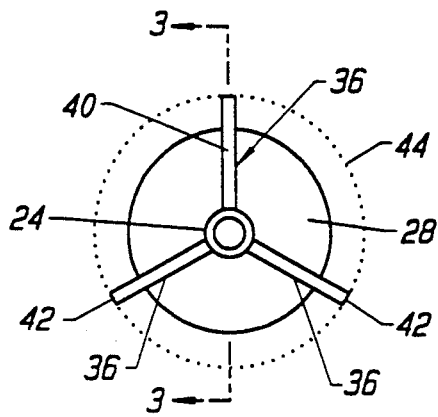
FIG. 2 schematically illustrates a front view of the apparatus of FIG. 1 showing the arrangement of three outwardly extending protrusions.
Figure 2A:
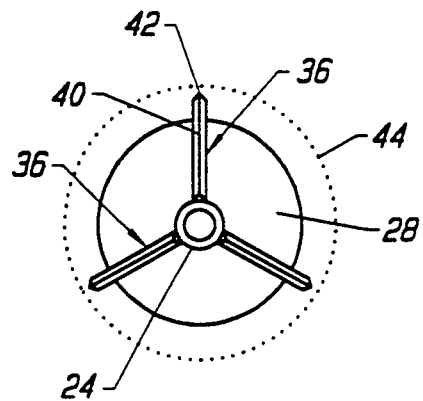
FIG. 2a schematically illustrates a front view of the apparatus of FIG. 2 showing an alternate form of three outwardly extending protrusions.

Referring now to the drawings, wherein like components are designated by like reference numerals, FIGS. 1 and 2 show the general form of the present invention. Details of the construction of the apparatus and its function may be understood by reference to FIGS. 3, 6, and 7.

The apparatus, designated by the general numeral 20 comprises a body 22. Body 22 includes a first cylindrical portion 24 and a second cylindrical portion 26 having a larger diameter than first cylindrical portion 24. Cylindrical portions 24 and 26 are joined by a frustro-conical portion 28. Body portions 24, 26 and 28 are generally coaxial about a body axis 30. Body 22 is open at a first (front) end 32 and second (rear) end 34.

Figure 3:
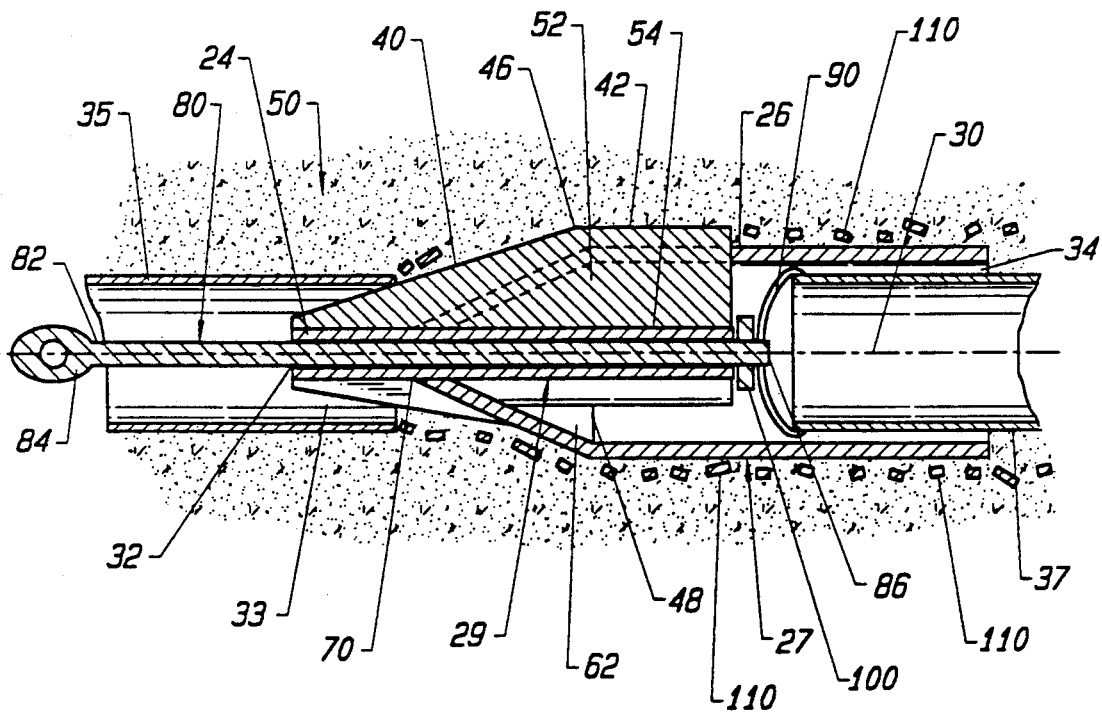
FIG. 3 schematically illustrates a cross section view of the apparatus of FIG. 1 taken in the direction 3—3 of FIG. 2.

Generally, first cylindrical portion 24 has an outside diameter less than the inside diameter of an existing pipe 35 (See FIG. 3) being replaced. For example, cylindrical portion 24 has an outside diameter about one-half of the inside diameter of pipe 35. Cylindrical portion 26 generally must have an outside diameter greater than the outside diameter of pipe 35, for example it may have a diameter about two inches (2") greater than the outside diameter of pipe 35. Cylindrical portion 26 must also have an inside diameter greater than the outside diameter of replacement pipe 37, however, the smaller the difference between the outside diameter of pipe 35 and the inside diameter of cylindrical portion 26 the smaller is the probability that debris may enter cylindrical portion 26 as it is being drawn A difference in diameter of about one-half inch has been found adequate Three elongated protrusions 36 are generally equally spaced around body 22 and extend generally radially outward therefrom. Protrusions 36 have an outermost edge 38 which may be flat as shown in FIG. 2, or pointed as shown in FIG. 3. Outermost edge 38 includes a tapered portion 40, inclined to body axis 30, and a straight portion 4 extending generally parallel to body axis 30. Outermost edges 38, at any point along axis body axis 30, may generally be described as lying on an a circle indicated whimsically by broken line 44 (See FIG. 2). Circle 44 has its smallest diameter at about front end 32 of body 22. This smallest diameter must be smaller than the inside diameter of pipe 35 to allow edges protrusions 36 to penetrate therein. Generally, circle 44 may have a smallest diameter between about one-half and three-quarters of the inside diameter of pipe 35. Sloping portion 40 of edge 38 may extend from about first end 32 along first cylindrical portion 24 and frustro-conical portion 28 to a point 46 on edge 38. Point 48 may be generally aligned with junction 48 between cylindrical portion 26 and frustro-conical portion 28. Straight portion 42 of edge 38 extends partially along cylindrical portion 26 ending at point 50. Circle 44 has its maximum diameter between point 46 and point 50. As will be explained, below the location of point 50 is determined primarily by the construction details of body 22. Straight portion 42 may extend completely along cylindrical body portion 26. The maximum diameter of circle 44 must be greater than the diameter of cylindrical portion 26 so that protrusions 36 may extend radially outward therefrom.

Body 22 is preferably constructed such that it does not have moving or removably attached parts which may come into forceful contact with existing pipe 35 or surrounding earth 50 in which it is buried. Cylindrical portion 24 includes a first hollow cylindrical member or pipe 29. Pipe 29 may be made from seamless stainless steel tube having a wall thickness of about three eighths of one inch. Cylindrical portion 26 includes a second cylindrical member or tube 27. Tube 27 may be also be made from seamless stainless steel tube having a wall thickness of about three eighths of one inch. Pipe 29 extends partially into tube 27. Preferably pipe 29 has a length about equal to tube 27. About one-third the length of pipe 29 may extend within tube 27.

Figure 4:
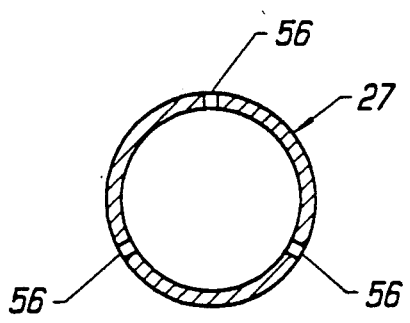
FIG. 4 schematically illustrates slots in a cylindrical portion of the body of the apparatus of FIG. 1.

Protrusions 36 may be formed from formed flat plates 52 having a thickness of about threeeighths of one inch. Plates 52 are attached along edge 54 of plates 52, preferably by welding, to pipe 29. Plates 52 extend through slots 56 in cylinder 27 as illustrated by FIGS. 3 and 4. Plates 52 are attached to cylinder 27, preferably by welding, at least along edges 60 of slots 56. Frustro-conical portion 28 may be formed by three curved plates or frustro-conical sections 62. Each of the sections 62 extends between two adjacent plates 52. The sections 62 include two generally straight edges 64 which are be welded to plates 52. Sections 62 are also welded to tube 27 at junction 48 and to pipe 29 at a point 70 thereon such that a portion of the pipe 29 remains uncovered by sections 62 and thus forms cylindrical portion 24 of body 22. Preferably point 70 is chosen such that about one-third the length of pipe 29 remains uncovered.

Figure 8:
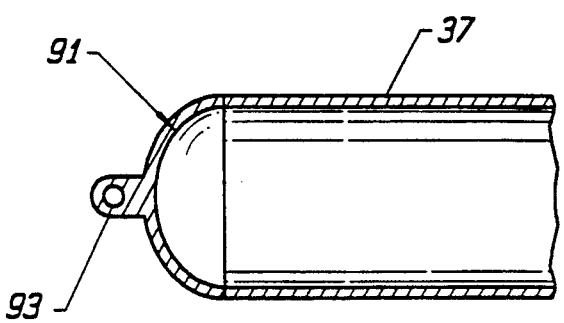
FIG. 8 schematically illustrates a cross section of a replacement pipe including a welded on cap for attaching the pipe to a pulling cable.

Apparatus 20 includes a rod 80 which extends axially through cylindrical body portion 24, i.e., through pipe 29, into cylindrical body portion 26. Rod 80 includes one end 82 thereof a clevis 84 for attaching a cable (not shown in FIGS. 1 and 3). The cable may in turn be attached to a device, such as a winch (see FIG. 6), providing means for connecting rod 80 to a pulling force. The dimensions of clevis 84 are preferably such that it may not pass through pipe 29. A clamp 90 located at another end 86 of rod 80. Clamp 90 provides means for attaching a replacement pipe 37 thereto. Alternately a cap 91 including a clevis 93 for attaching a cable may be welded onto replacement pipe 37 as shown in FIG. 8. A bearing plate 100 is also attached to end 86 of rod 80. The dimensions of bearing plate 100 are such that it may not pass through pipe 29. The maximum possible extent to which rod 80 may be withdrawn from body 22 at front end 32 is thus reached when bearing plate 100 contacts pipe 29 or one or more of plates 52. When this occurs, pulling force applied to rod 80 will be transferred via bearing plate 100 to body 22.

Rod 80 preferably is sufficiently long that clamp 90 extends beyond rear end 34 of body 22 when clevis 84 is in contact with front end 32. Clamp 32 may thus be easily attached to replacement pipe 37. When replacement pipe 37 is attached to clamp 90 it may be drawn inside tube 27 by rod 80. As such, a front length 39 of replacement pipe 37 may be protected by cylindrical portion 26 of body 22, for example, cylindrical portion 26 may be sufficiently long that length 39 is about three times the diameter of pipe 37.

Figure 5:
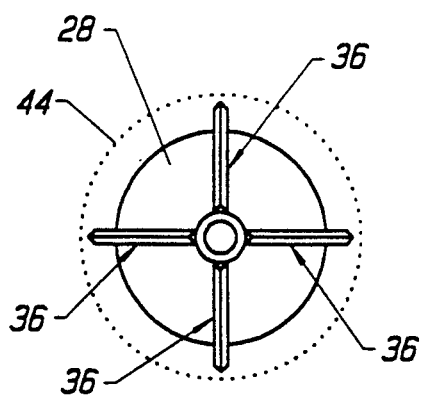
FIG. 5 schematically illustrates a front view of apparatus according to the present invention having four outwardly extending protrusions.

The present invention has been described in terms of apparatus having three outwardly extending protrusions. Three is believed to be least and the preferable number of such protrusions required for proper functioning of the apparatus. The apparatus, however, may function effectively if four or more protrusions are used. An example of apparatus having four protrusions is shown in FIG. 5.

Figure 6:
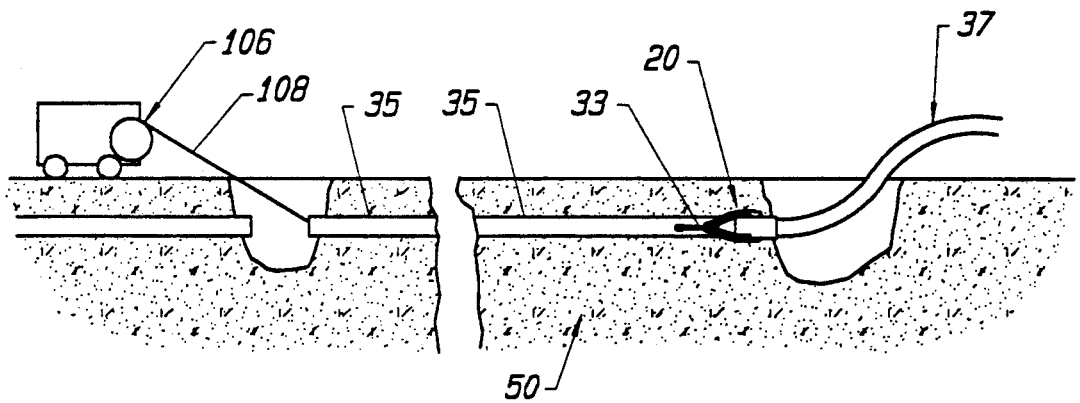
FIG. 6 schematically illustrates a method of using the apparatus of FIG. 1.
Figure 7:
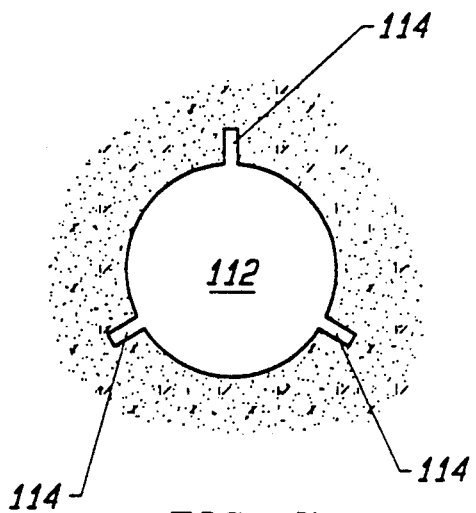
FIG. 7 schematically illustrates one form of a hole which may be produced by the apparatus of FIG. 1, used as shown in FIG. 6.

As already noted apparatus 20 may be drawn by a winch. The winch may be connected to the apparatus by a cable. For example, six-inch diameter clay pipe may be replaced with eight-inch diameter polyethylene using a winch which is capable of exerting a pulling force of 100,000 lbs. The winch may be a Braden winch available from Braden Company of Tulsa, Oklahoma. The winch may be connected to apparatus 20 by one and one-eighth-inch diameter steel cable. Referring now to FIGS. 3 and 6, apparatus 20, having replacement pipe 37 attached thereto, is inserted into an open end 33 of existing pipe 35. Winch 106, for supplying a pulling force, is connected to apparatus 20 by cable 108. The pulling force is used to draw protrusions 36 of into forceful contact with existing pipe 35. Pipe 35 may thus be fractured into fragments 110 by the applied pulling force. Pipe fragments 110 and portions of surrounding earth 50 may be forced outward by protrusions 36 or may be trapped therebetween. As apparatus 20 is advanced in the direction shown by arrow A by the pulling force, fragments 110 and portions of earth 50 trapped between protrusions 36 are forced outward by frustro-conical sections 62. Protrusions 36 also loosen or channel earth in a circle having a greater diameter than cylindrical body portion 26, i.e., in a circle having a diameter about the maximum diameter of circle 44. Forward motion of apparatus 20 tends to create a hole 112 (See FIG. 7) having channels 114 in the side thereof. Portions of earth 116 between channels 114 may be broken up by outwardly expanded pipe fragments. The resulting combination of pipe fragments and earth may then be compressed by passage of cylindrical body section 26. The extent to which protrusions 36 extend radially beyond body 22 is preferably selected such that earth surrounding existing pipe 35 is loosened or channeled in a diameter large enough to facilitate passage of apparatus 20, but not so large that pipe fragments and earth can not be compressed and smoothed by subsequent passage of cylindrical portion 26 to facilitate drawing of replacement pipe 37. For example, when drawing eight-inch pipe, straight portions 42 of protrusions 36 may extend between about one and two inches beyond cylindrical portion 26.

As explained above, extension of protrusions 36 beyond cylindrical portion 26 is believed to be important in breaking up earth to facilitate passage of apparatus 20 along the path of pipe being replaced. As such, the apparatus may be used without the need to apply a continuous or percussive force thereto as required in prior art apparatus. Further, it is believed that elongated extended protrusions 36 in general, and portions 42 extending from cylindrical portion 26 in particular, provide means for imparting directional stability to the apparatus, i.e., maintaining its direction of progress along the axis of a pipe being replaced. As discussed above, maintaining the direction of progress of pipe fracturing apparatus 20 is believed to be important in preventing the accumulation of debris in front of the apparatus and preventing forward progress thereof.

Apparatus according to the present invention has been used to replace eight thousand feet (8000 ft.) of six-inch clay pipe with eight-inch polyethylene pipe. During the entire operation it was only necessary on four occasions to excavate to free trapped apparatus when no further forward progress thereof was possible.

The present invention has been described as a number of embodiments. The invention, however, is not restricted to the embodiments described and depicted. Rather, the invention is defined by the appended claims.

What is claimed is:

1. Apparatus for replacing an existing buried pipe with a replacement pipe, comprising:
   body having a first end, a second end, and a body axis, said body including a first cylindrical portion, a second cylindrical portion generally coaxial with said first cylindrical portion and having a diameter smaller than the diameter thereof, and a frustro-conical portion joining said first and second cylindrical portions;
   at least three protrusions extending radially outward from said body
   means for transmitting a pulling force to said apparatus;
   means attached to said means for transmitting a pulling force to said apparatus for attaching the replacement pipe.

2. The apparatus of claim 1 wherein said first cylindrical portion has an outside diameter less than the inside diameter of the existing pipe, and said second cylindrical portion has an outside diameter greater than the diameter of the existing pipe and an inside diameter greater than the outside diameter of the replacement pipe.

3. The apparatus of claim 2 wherein said protrusions are positioned such that the outermost edges thereof lie generally on a circle about said body axis, said circle having its smallest diameter at said first end and said smallest diameter being less than the inside diameter of the existing pipe.

4. The apparatus of claim 3 wherein said rod is longer than said body.

5. The apparatus of claim 4 wherein said rod includes means on said first end for attaching said body to a winch for transmitting said pulling force to said rod, and a bearing plate on said second end of said rod for transmitting said pulling force to said body.

6. The apparatus of claim 1 wherein said first cylindrical portion includes a first hollow cylindrical member.

7. The apparatus of claim 6 wherein said second cylindrical portion includes a second hollow cylindrical member.

8. The apparatus of claim 7 wherein said second cylindrical member has a length about three times the outside diameter of the replacement pipe.

9. The apparatus of claim 7 wherein said first cylindrical extends coaxially inside said second cylindrical member.

10. The apparatus of claim 9 wherein each of said protrusions is formed by a radial member attached to said first cylindrical member and extending radially outward therefrom.

11. The apparatus of claim 10 wherein said radial member extends through a slot in said second cylindrical member.

12. The apparatus of claim 11 wherein said frustro-conical portion is formed from sections, each section extending between adjacent radial members, and extending from said second cylindrical member to said first cylindrical member at a point thereon such that a portion of the cylindrical member remains uncovered by said sections and forms the first cylindrical portion of said body.

13. The apparatus of claim 12 wherein said rod is longer than said body.

14. The apparatus of claim 12 wherein said pulling force transmitting means includes means on said first end of said rod for attaching said body to a winch for transmitting said pulling force to said rod, and a bearing plate on said second end of said rod for transmitting said pulling force to said body.

15. The apparatus of claim 1 wherein said second cylindrical portion has a length equal to three times the diameter of the replacement pipe.

16. The apparatus of claim 2 wherein said protrusions have an outermost edge including a sloping portion and a straight portion, said sloping portion inclined to said body axis and extending from said first end of said body along said first cylindrical portion and said frustro-conical portion, and said straight portion extending generally parallel to said body axis and extending partially along said second cylindrical portion.

17. The apparatus of claim 3 wherein said means for transmitting a pulling force to said apparatus includes a rod having a first end and a second end, said rod slidably extending axially through said body.

* * * * *